E. Reynolds.
Hay Fork.
No. 44,748.          Patented Oct. 18. 1864.
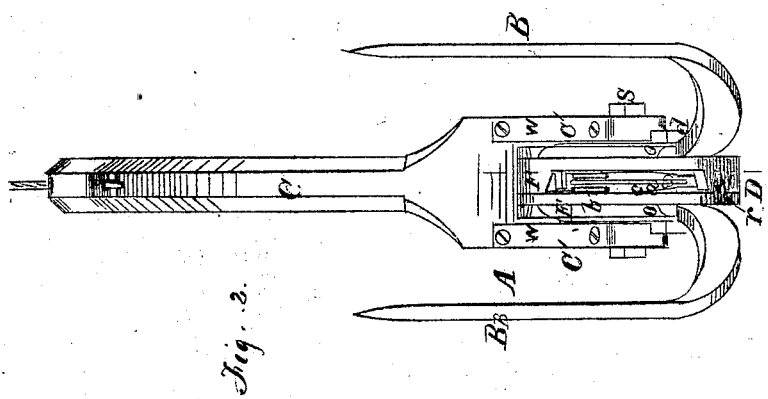
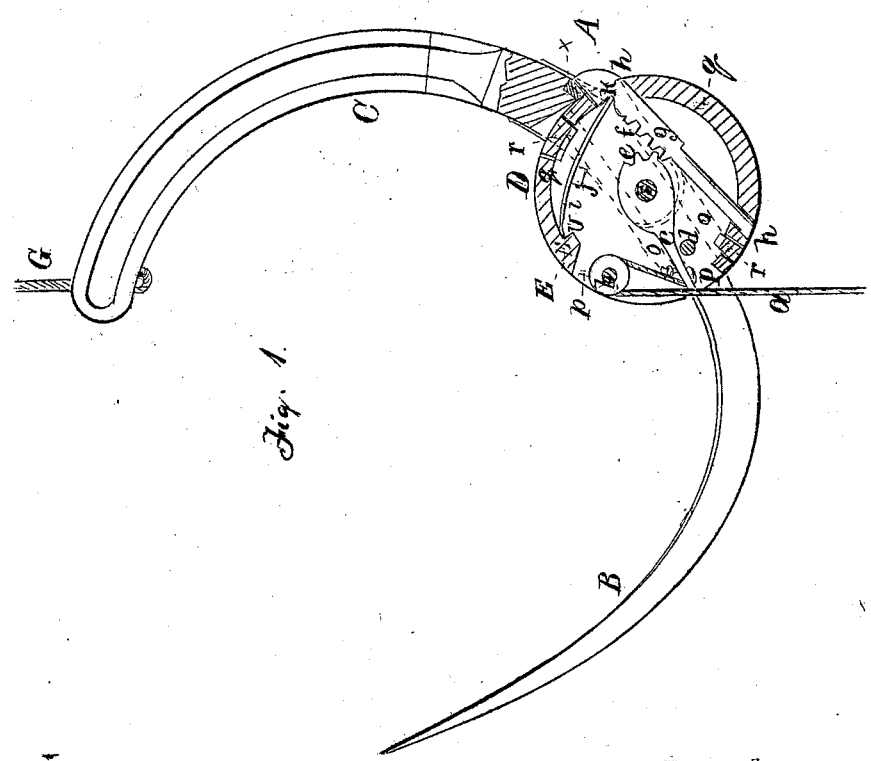
Witnesses
Henry Morris
C. S. Topliff
Inventor
Edmund Reynolds
per Munn & Co.
attorneys

UNITED STATES PATENT OFFICE.

EDMOND REYNOLDS, OF CORUNNA, MICHIGAN.

IMPROVEMENT IN HORSE HAY-FORKS.

Specification forming part of Letters Patent No. 44,748, dated October 18, 1864.

*To all whom it may concern:*

Be it known that I, EDMOND REYNOLDS, of Corunna, in the county of Shiawassee and State of Michigan, have invented new and useful Improvements in Hay-Forks; and I do hereby declare that the following is a full, clear, and exact description thereof, which will enable those skilled in the art to make and use the same, reference being had to the accompanying drawings, forming part of this specification, in which—

Figure 1 represents a longitudinal section of a hay-fork constructed after my invention. Fig. 2 is an elevation thereof, the prongs of the fork being turned toward the observer.

Similar letters of reference indicate corresponding parts.

My hay-fork belongs to that class which is intended for hoisting hay or straw, and carrying its load by means of rope and pulley and a truck or other mechanical devices to a mow, when it is made to release its load, which is then deposited upon the mow or other place over which the fork has been brought.

My improvement consists in the construction and mode of operation of several parts of the apparatus, which are hereinafter described.

A is the fork, composed of a stock, C, and tines B, (two or more,) which are connected together by means of a bolt and nut, S', which passes through the axis of a metallic box, D, composed of two disks, E and F, one of which has a rim or flange, $q$, occupying about three-fourths of its circumference on its inner edge, the other being smooth on its inner face, except where projections $r\ r$, at opposite points of its circumference, are made, which fit into recesses in the flange $q$ of the opposite disk for the purpose of making a joint between the disks. An open space, $p$, is left on the circumference of the box between the ends of the flange $q$, which allows room for the play of the cord $a$ and for the pulley $b$, and for the vibrations of the toothed lever $c$ between the disks. Recesses $h$ are cut in the flange $q$ to receive a sliding rack, $g$, which lies therein, being held down by the opposing disk, and being moved in one direction by the teeth $e$ of the lever $c$, which gear with the teeth $f$ of the rack, and in the opposite direction by a flat spring, $i$, which is held up by a stop, $j$, projecting vertically from disk E, the ends of the spring resting respectively in a notch, U, cut in the flange $q$, and in a notch, $k$, in the rack. The action of the spring is to force one end of the rack outward, so as to project beyond the periphery of the box D, and the end which so projects is formed into a bolt, one side of which is beveled and the other straight. The toothed lever C moves upon the bolt S as its fulcrum, and is kept from becoming disengaged from the rack by means of a stop, $d$, and by being held secure against lateral displacement by the sides of the box D. The cord $a$ is fastened to its outer end, and thence carried around the inside of the pulley $b$ to the outside of the box, and is allowed to hang down between the tines of the fork. The outside of each disk has a groove formed by parallel ribs O (two on each disk) extending across in the line of their diameter, each of which receives the shank of one of the tines B, as seen in the figures. A flange (not shown) is raised on the outside at the edge of each disk, extending along part of their circumference, which furnish the lines of contact or bearing surfaces of the box D with the arms C' of the stock, between which the box rotates. The arms C', which are made by bifurcating the stock, extend far enough to embrace the box. Their faces are protected by metal straps W, and the top of their crotch is protected by a metallic plate, $x$, which serves as the keeper of the bolt. The stock and tines are to be curved, so that they shall, when properly attached, bear a resemblance in their general outline to a circle two-thirds completed.

The several parts being properly placed on one of the disks, the disks are next secured together by means of a bolt and nut, $d$, which also secure the shanks of the tines in their grooves. The bolt $d$ serves also as a stop to limit the backward motion of the toothed lever $c$. The box D is then placed within the arms C', to which it is secured in the position shown in Fig. 1 by means of the bolt and nut S, when the apparatus is ready for use. Its operation is as follows: The fork is brought round, so that the tines B shall be perpendicular to the layer of hay or straw or other stuff which is to be moved, when they are forced down into it their whole length. Power being now applied to the hoisting-rope G, the fork is brought thereby to the position shown in the figures, the box D and the fork being locked to the stock by the bolt of the rack $g$. When the fork has reached the place where its load is to be dumped, the cord a is pulled, when the lever c causes the rack g to slide in its recesses h, thereby withdrawing its bolt end and unlocking the box and its forks from the stock C, when the load of hay or other stuff slips off the tines. By making the box which holds the operating devices of this fork of two separate disks I am enabled to repair any part that becomes broken or displaced with facility.

I claim as new and desire to secure by Letters Patent—

1. The combination of the rotating box D, to which the tines of the fork are rigidly secured, with the stock C, substantially as above described.

2. Constructing the box D of two disks, between which are placed the sliding rack, the spring $i$, the toothed lever, and the pulley $b$ for locking and unlocking the parts of the fork, substantially as above described.

EDMOND REYNOLDS.

Witnesses:
M. H. REYNOLDS,
I. B. WHEELER.